United States Patent [19]

Zappe

[11] 3,764,905
[45] Oct. 9, 1973

[54] APPARATUS FOR MEASURING PULSED SIGNALS USING JOSEPHSON TUNNELING DEVICES

[75] Inventor: Hans H. Zappe, Granite Springs, N.Y.

[73] Assignee: International Business Machines Corporation, Armonk, N.Y.

[22] Filed: June 30, 1972

[21] Appl. No.: 267,810

[52] U.S. Cl.............. 324/102, 307/306, 324/127, 340/173.1
[51] Int. Cl.................. G01r 19/00, G01r 27/28
[58] Field of Search........... 324/102, 127, 43 R, 324/117; 307/306; 340/173.1; 332/51 R

[56] References Cited
UNITED STATES PATENTS

| | | | |
|---|---|---|---|
| 2,987,631 | 6/1961 | Park, Jr. .......................... | 307/306 |
| 3,259,844 | 7/1966 | Casimir.......................... | 307/306 |
| 3,643,237 | 2/1972 | Anacker ......................... | 307/306 |
| 3,705,393 | 12/1972 | Anacker et al. ................. | 307/306 |

Primary Examiner—Robert J. Corcoran
Attorney—Jackson E. Stanland et al.

[57] ABSTRACT

A device and method for measurement of ultra fast waveforms with increased accuracy and storage capability. A superconducting loop contains at least one Josephson tunneling device and is located adjacent to the signal line along which travels the waveform to be measured. Magnetic flux from the waveform intercepts the loop in an amount which is dependent upon the amplitude of the waveform at any instance in time. Control means is provided to switch the Josephson tunneling device to its zero voltage state at the time the waveform is to be sampled. This traps the magnetic flux due to the waveform and the flux will remain stored in a loop as long as the Josephson tunneling device remains in its zero voltage state. A test Josephson tunnel device located adjacent to the superconducting loop can be used to detect the amount of flux trapped in the loop. Non-repetitive pulses can be sampled and the device has a possible resolution of 5 picoseconds. The bandwidth of the non-repetitive signal pulses can be 100 gHz.

20 Claims, 11 Drawing Figures

PATENTED OCT 9 1973 3,764,905

APPARATUS FOR MEASURING PULSED SIGNALS USING JOSEPHSON TUNNELING DEVICES

BACKGROUND OF THE INVENTION

1. Field of the Invention

This invention relates to methods and apparatus for pulse sampling and analysis, and more particularly to a method and apparatus using superconductive loops and Josephson tunneling devices to provide greatly improved results.

2. Description of the Prior Art

Pulse measurement and analysis has been performed in prior art systems which provide many sampling techniques. An example of a prior art system using magnetic thin films for recording and storing of a time varying signal is described in U. S. Pat. No. 3,656,128. In that reference, an input signal is digitized by a matrix array and is stored in binary memory cells comprising magnetic thin films. These thin films are bistable elements which are switched between two stable states in accordance with the magnetic fields which intercept them. These fields are due to coincident currents produced in digit and word lines by associated drivers, and in the digit lines by the input signal to be recorded.

Prior art pulse sampling and recording means generally cannot be used for non-repetitive pulses. That is, for signal pulses which are extremely fast, it has generally been required to have the signal pulse repeat itself so that samplings can be made of it at various times. However, in some types of complex analysis, non-repetitive signal pulses may be created which have to be analyzed and recorded. Prior art sampling means have not been able to do this satisfactorily, with the result that critical information is often lost.

Prior art sampling means have also not been as fast as would be desirable, especially in the measurement of ultra fast signal pulses. That is, it is desirable to distinguish changes in an input signal pulse which are extremely small, being in the picosecond range.

The prior art pulse sampling techniques have also used generally high impedance circuitry so that their use has been only in high impedance circuits. It is desirable to provide a low impedance pulse measurement and recording means which has utility in circuits having very low impedance, as for instance, circuits comprising superconductive elements.

It is also desirable to have a pulse analysis means which can be read out directly without a large amount of associated electronic hardware. That is, each sample point where the signal pulse was recorded should be accessible directly in order to obtain information about the amplitude of the signal pulse as a function of time.

The prior art sampling means have not met some or all of these criteria. In addition, elaborate techniques have been devised to record the amplitude of the signal pulses when bistable elements having only two stable states are used in the circuitry. These prior art techniques utilize matrices of bistable elements which have different thresholds in order to obtain measurements of different signal amplitudes. However, it is advantageous to avoid the need for storing the signal amplitude in various locations in a matrix. Also, it is desirable to have a recording element which records and stores the exact amplitude of the input signal pulse to be measured regardless of its magnitude, rather than one which is merely responsive to a single threshold level of amplitude.

Accordingly, it is a primary object of this invention to provide an improved means and method for recording and measuring signal pulses.

It is another object of this invention to provide an improved method and apparatus for recording and measuring input signal pulses which will measure these pulses with high resolution.

It is still another object of this invention to provide an improved method and apparatus for recording and measuring signal pulses which provides a very close approximation to the exact amplitude of the signal at any instant of time.

It is a further object of this invention to provide improved means for measurement and recording of signal pulses which will provide indefinite storage of information representative of the signal pulse.

It is a still further object of this invention to provide an improved means and method for recording and measuring input signal pulses which has the capability of directly inducing back into the signal line the pulse shape which was recorded and stored.

It is another object of this invention to provide an improved apparatus for recording and measurement of input signal pulses which can be fabricated in a planar environment and which can be read out directly with a minimum of associated electronic gear.

It is still another object of this invention to provide an improved method and apparatus for measuring and recording input signal pulses which can be used in circuits having very low impedances.

BRIEF SUMMARY OF THE INVENTION

The improved method for measurement and recording of input signal pulses uses the concept of trapping magnetic flux due to the signal pulse in a superconductive loop having at least one Josephson device (such as a tunnel junction or weak link) therein. Magnetic flux from the input signal intercepts the superconductive loop when the Josephson tunnel junction is in its resistive state (maximum Josephson current $I_m=0$) state. This flux is trapped in a superconductive loop as a persistent current when the Josephson tunneling device is then switched to its zero voltage state (non-resistive state). The amount of flux trapped in the loop is proportionally quantized to the amplitude of the input signal pulse at the instant the Josephson tunneling device switches to its zero voltage state. This closes the loop to trap the flux and provides permanent storage of the signal pulse, as long as the Josephson tunneling device remains in its zero voltage state.

The flux stored in the superconductive loop can be read out directly by using the persistent current in the loop as a control line for another Josephson tunneling device (test device). Depending upon the magnitude of the persistent current (which in turn depends upon the amount of flux stored in the loop), the test Josephson juvention will be switched into a non-zero voltage state which is indicated by a reading on a volt meter or other suitable instrument. The flux in the superconducting loop is read by the test junction by passing current through the test junction and noting the magnitude of this current at the time when a voltage is developed across the test junction. This can be directly correlated to the amplitude of the persistent current in the superconducting loop, to the flux stored in the superconducting loop, and ultimately to the amplitude of the signal pulse to be measured.

Since a Josephson tunneling device switches rapidly from one voltage state to the other, a high resolution sampling apparatus is obtained. Further, means are provided to rapidly switch the Josephson tunneling junction in the superconductive loop to fully utilize its high speed switching capabilities.

Any number of superconducting loops having Josephson tunneling junctions therein can be provided in proximity to the signal line along which travels the pulse to be measured. This will provide an indication of the signal pulse amplitude over a larger distance. In this way, it is possible to make a definitive measurement of a signal pulse which occurs only once on the signal line.

Because superconducting loops can be directly deposited on a suitable substrate, it is possible to use planar fabrication techniques to provide the entire analytical instrument. Therefore, a measurement and recording apparatus is provided that is easily fabricated in thin film form on a substrate.

The flux stored in the superconductive loop will remain stored indefinitely, as long as the Josephson tunneling device(s) in the loop remain in the zero voltage state (superconductive state). Therefore, indefinite storage of the signal is obtained.

Because a superconductive loop having a Josephson tunneling device therein can store many flux quanta, a near continuum of steady states will be provided. Therefore, it is possible to obtain an exact measurement of the amplitude of the input signal. This is in contrast with sampling apparatus that uses bistable elements which are responsive to signal amplitudes of a fixed threshold and which provide no further information even if the amplitude of the signal is significantly greater than the threshold amount.

Readout directly by an associated Josephson tunneling device is possible. This means that minimum electronic gear is required and the entire sampling and readout is performed by devices on the same substrate. In addition, the original signal pulse can be re-induced in the signal line, merely by changing the voltage state of the Josephson tunneling device in the superconductive loop. This will induce a change in flux coupling the signal line which will re-establish the shape of the signal pulse in the line.

This invention provides a pulse sampling and recording means using a Josephson tunneling junction in a superconductive loop. In contrast with other sampling scopes, the present invention will work to analytically reproduce the signal pulse even though it appears only once on the signal line. In addition, ultra fast waveforms can be analyzed, which could not be achieved with the prior art apparatus.

The present invention recognizes that a structure comprising a superconducting loop having a Josephson junction therein is not new. For instance, U. S. Pat. 3, 363,200 describes the use of a Josephson junction device in a superconducting loop in combination with an external means for providing a magnetic field intercepting the loop. The current in the loop is a periodic function of the magnetic field intercepting the loop. Also, U. S. Pat. 3,445,760 describes the use of a Josephson tunneling device magnetometer for sensing magnetic fields.

In addition to these references, copending application Ser. No. 51,057, filed June 30, 1970 now U.S. Pat. No. 3,705,393 and assigned to the present assignee describes superconducting loops having Josephson junctions therein which are used for memory cells. However, the prior art has not recognized that a superior pulse sampling and recording device could be realized with the particular means set forth in this invention.

These and other objects, features and advantages will be more fully apparent from the following more particular description of the preferred embodiments.

DETAILED DESCRIPTION OF THE PREFERRED EMBODIMENTS

Figure 1:
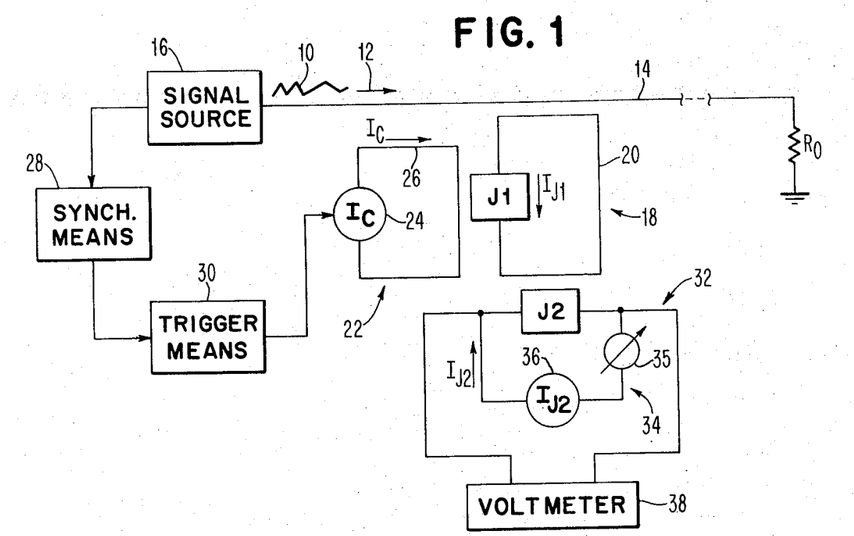
FIG. 1 shows a schematic illustration of a pulse analyzing and recording apparatus using Josephson tunneling junctions in superconducting loops.

FIG. 1 is a schematic illustration of the circuit used to measure a signal pulse represented by waveform 10 traveling in the direction of arrow 12 along signal line 14. In this case the signal line is terminated by a resistance $R_0$. Of course, the signal line can be part of circuitry which is used in some operation, such as memory or logic, and can be used to provide inputs to other circuitry, rather than being terminated as is shown here.

Signal source 16 provides the waveform 10 to be measured and recorded. This signal source could be a discrete component for providing signals, or could be any other circuitry used to perform another function. For instance, signal source 16 could be a complex arrangement of amplifiers and waveform generators used for some other purpose. It may be desirable to analyze the spurious pulses formed from the signal source and the apparatus described herein will adequately do that.

Located adjacent signal line 14 is a superconducting measuring loop generally designated 18. Loop 18 comprises a superconductive line 20 and at least one Josephson tunneling device J1. Loop 18 is located sufficiently close to signal line 14 that the magnetic field produced by waveform 10 will intercept loop 18 when waveform 10 travels along signal line 14.

A control means generally designated 22 is used to switch the voltage state of Josephson tunneling device J1 in a known manner. For instance, control means 22 will provide a control current $I_c$ which creates a magnetic field intercepting Josephson device J1. Depending upon the magnitude of the magnetic field intercepting J1, it will be in its zero resistance state or its finite resistance state. In FIG. 1, control means 22 comprises a current source 24 connected to a conductor 26 which is sufficiently close to tunnel device J1 that the magnetic field established by current $I_c$ in line 26 will intercept tunnel device J1. It is not necessary that conductor 26 be comprises of a superconductive material, although this is generally the case.

In order to be able to control the voltage state of Josephson tunneling device J1 at the proper time, a synchronization means 28 is responsive to signal source 16. Synchronization means 28 provides a clock pulse to trigger means 30, which in turn provides a trigger pulse to current generator 24. This controls the magnitude of control current $I_c$ which in turn controls the voltage state of Josephson tunneling device J1.

As will be apparent when the operation of the circuit of FIG. 1 is described, the magnitude of the current $I_{J1}$ in superconducting loop 18 a measure of the amplitude of waveform 10, at the instant of time when magnetic flux from waveform 10 is trapped in superconducting loop 18. In order to measure current $I_{J1}$ to therefore determine the amplitude of waveform 10 at the instance of triggering, a detection means generally designated 32 is provided. Detection means 32 comprises a superconducting loop 34 having therein another Josephson tunneling device J2. Current $I_{J2}$ is provided through tunnel device J2 by current source 36. Connected across tunnel device J2 is a volt meter 38 which indicates the voltage state of tunnel device J2.

In operation, the current through J2 at which a voltage develops across J2 is dependent upon the magnitude of current $I_{J1}$ flowing in superconductive loop 18. Since the magnitude of current $I_{J1}$ is related to the amplitude of the waveform 10, the development of voltage on volt meter 38 occurs at a current $I_{J2}$ which is indicative of the circulating current $I_{J1}$.

Operation of the Circuit of FIG. 1

Figures 2, 3, 4:
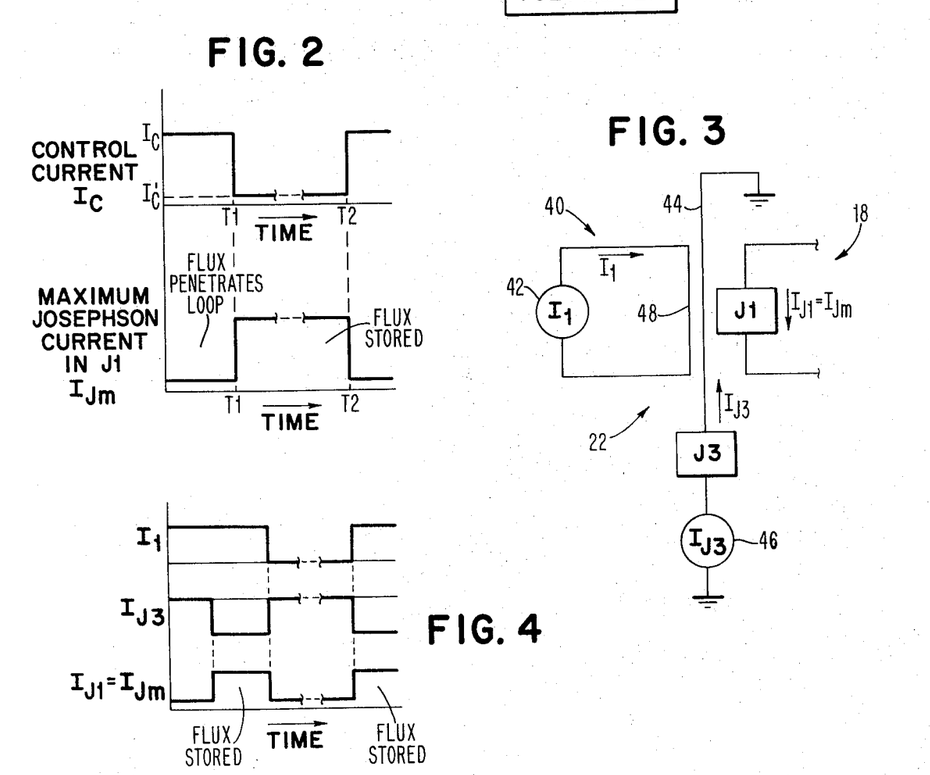
FIG. 2 shows plots of control current and maximum Josephson current versus time, which are used to explain the apparatus of FIG. 1.
FIG. 3 shows a means for obtaining rapid switching of the Josephson tunneling junction in the measuring loop in order to obtain high resolution measurement and recording.
FIG. 4 shows plots of the various currents in the apparatus of FIG. 3, measured against time.

In order to explain the operation of the circuit of FIG. 1, the waveforms shown in FIG. 2 will be utilized. These waveforms are plots of control current $I_c$ versus time and maximum Josephson current $I_{Jm}$ through tunnel device J1, also versus time.

Assume that a complex waveform 10 is traveling in signal line 14 in the direction of arrow 12. Superconducting loop 18 will be intercepted by the magnetic flux due to current associated with signal 10. That is, Josephson device J1 is in its resistive state at this time so that the flux due to waveform 10 will penetrate superconducting loop 18.

At the time it is desired to record the input signal 10, Josephson device J1 is switched to its zero voltage state in order to trap the flux in superconducting loop 18. Device J1 is switched to its zero voltage state by control means 22. Generally, tunnel device J1 will switch to its zero voltage state when control current $I_c$ decreases in value. This is shown in FIG. 2. That is, when control current $I_c$ has its higher value, the maximum Josephson current $I_{Jm}$ in loop 18 is at a minimum (preferably zero). At that time flux penetrates loop 18. When control current $I_c$ decreases to a value $I'_c$, the maximum Josephson current allowed in loop 18 increases and flux will be trapped in the loop at that time. Accordingly, FIG. 2 shows that at time T1 a sampling of pulse 10 is made. Current $I_c$ is reduced to a value $I'_c$ at which time the maximum Josephson current in loop 18 is increased and the flux which has penetrated the loop is then stored in the loop as a persistent current. Flux will remain stored in loop 18 for as long as control current $I_c$ has the minimum value $I'_c$. When time T2 is reached, control current $I_c$ increases and the flux stored in the loop will then escape.

The maximum Josephson current possible through device J1 depends on the area of the tunnel barrier in J1, the thickness of the tunnel barrier, etc. That is, it is a function of the Josephson tunneling device itself. However, the maximum amount of flux which is able to penetrate superconducting loop 18 and be stored therein is a function of the maximum Josephson current through tunnel device J1 and the inductance of superconducting loop 18.

In more detail, the flux intercepting loop 18 is given by the following expression:

$$\phi(t) \propto \mu_0 H(t) \cdot A \qquad 1.$$

where A = area of loop 18,
$\mu_0$ = permeability of the medium inside loop 18,
$H(t)$ = the magnetic field intercepting loop 18. Penetration of flux into loop 18 will occur once the eddy currents established in this loop die down. These eddy currents are produced in opposition to flux penetration and die out in accordance with the time constant of the superconducting loop 18. Generally, when loop 18 is critically damped, the eddy currents can die out in approximately 5 picoseconds in a properly designed device. Accordingly, the loop can be switched rapidly allowing for a very high resolution sampling apparatus and method.

Flux will be stored in loop 18 in quantized amounts. That is, multiple number (N) of flux quanta $\phi_0$ ($\phi_0 = 2 \times 10^{-15}$ volt-second) will be trapped in superconducting loop 18. The maximum amount of flux quanta N which can be stored in loop 18 is given by the following expression:

$$N \approx LI_{Jm}/\phi_0 \qquad 2$$

where N = 1, 2,...,N
L = the inductance of loop 18,
$I_{Jm}$ = maximum zero voltage current through tunnel device J1.

Current $I_{J1}$ through loop 18 acts as a control current to determine the voltage state of test junction J2. That is, the amount of persistent current $I_{J1}$ flowing in loop 18 will determine the maximum threshold current $I_{Jm}$ for tunnel device J2. Therefore, tunnel device J2 will be switched to its finite voltage state by current in loop 18. This voltage will occur at a current $I_{J2}$ which is related to $I_{J1}$, as explained previously.

Since the amount of persistent current $I_{J1}$ in loop 18 is related to the flux from waveform 10 which is in turn related to the amplitude of waveform 10, a direct indication will be obtained for the amplitude of signal 10.

Generally, it is desirable to use a non-linear Josephson tunneling device (one in which the self-field of the junction is important in its characteristic) for device J2. Non-linear Josephson junctions suitable for this use are described more fully in copending applications Ser. No. 158,315 filed June 30, 1971 in the name of H. H. Zappe and Ser. No. 194,977 filed Oct. 27, 1971 in the name of J. Matisoo, also assigned to the present assignee.

Resolution and Bandwidth

The bandwidth of an instrument is a measure of the resolving power of the instrument in terms of the frequency content of input signal 10. As the number of frequencies present in input signal 10 increases, the bandwidth of the instrument must be increased in order to accurately record and represent the input signal 10.

The resolution of this apparatus is measured by how fast the superconducting loop can be switched from a finite voltage state during which flux penetrates the loop to a zero voltage state during which flux is stored in the loop. This is a function of how quickly eddy currents, set up in loop 18 in opposition to the applied signal, will die down. This in turn is a function of the RLC parameters of superconducting loop 18. The resistance of loop 18 is that due to the junction J1 since the loop is superconducting, while the capacitance C of the loop is that which is primarily due to device J1. The inductance of the loop is due almost entirely to the superconductive line 20 itself.

Generally, maximum resolution is obtained when the RLC circuit representing loop 18 is critically damped. This is easily designed depending upon the particular junction chosen. Critical damping can provide a decay time for the eddy currents of approximately 5 picoseconds which allows the recording of very rapid changes in input signal 10.

Non-Destructive Direct Readout

Test Josephson tunnel junction J2 provides non-destructive readout of the flux trapped in superconducting loop 18. This is a direct readout since only minimum amounts of electronic gear are required to transform the recorded signal. Further, every sample location where the input pulse 10 is recorded is accessible by the readout meachanism 32.

Reproduction of Input Signal

It is possible to re-introduce the shape of input signal 10 to signal line 14 after it has been stored in superconducting loop 18. This is done by changing J1 to its finite voltage state so that flux stored in loop 18 will leak out and couple line 14. This will induce a voltage in line 14 which is proportional to the time derivative of flux previously stored in loop 18.

Measurement of Repetitive Signals

It is possible to operate the device of FIG. 1 even faster if repetitive signals 10 travel on signal line 14. If tunneling device J1 is switched to its zero voltage state before all eddy currents in superconducting loop 18 have died out, a small amount of flux will be trapped in loop 18. When the pulse 10 reappears, Josephson device J1 is briefly switched to its finite voltage state and then back to its zero voltage state in order to trap some more flux therein. This can be continued until the maximum amount of flux corresponding to the signal for that sampling period has been trapped. This may enable faster operation since the problem of eddy current decay is minimized.

Figure 3

FIG. 3 shows a control means for switching the voltage state of Josephson device J1 rapidly so as to improve resolution of the device of FIG. 1. In this case, control means 22 comprises a first loop 40 having a current pulse source 42 therein. Current source 42 produces a pulse of current $I_1$ through loop 40.

Control means 22 also includes a conductor 44 having a Josephson tunneling device J3 therein. Current $I_{J3}$ is provided to Josephson device J3 by the source 46.

Current $I_1$ in loop 40 is a control current for Josephson device J1, as is current $I_{J3}$ in conductor 44. Depending upon the presence and absence of these currents, the Josephson device J1 will be in either its zero voltage state or its finite voltage state. Because Josephson device J3 is capable of very rapid switching, control means 22 will rapidly switch J1. This will be more apparent in the following discussion relative to FIG. 4.

Figure 4

FIG. 4 shows plots of the various currents in FIG. 3 in order to illustrate the operation of control means 22. That is, plotted against time are the current values $I_1$, $I_{J3}$, and $I_{J1} = I_{Jm}$.

The current $I_1$ has a direction through portion 48 of loop 40 which is opposite to the direction of current $I_{J3}$ through conductor 44. This means that these currents will have oppositely directed magnetic fields intercepting device J1.

When current $I_1$ flows and current $I_{J3}$ is not present, device J1 in loop 18 has a small maximum Josephson current value (preferably zero). That is, device J1 is in its finite voltage state. During this state, flux enters loop 18. However, when current $I_{J3}$ flows in conductor 44, the magnetic field established by $I_{J3}$ will be oppositely directed to that established by $I_1$, with the result that the maximum current $I_{Jm}$ which can flow through device J1 increases. At this time flux will be stored in the superconducting loop 18. As long as current $I_{J3}$ flows, device J1 will remain in its zero voltage state.

Figures 5A, 5C:
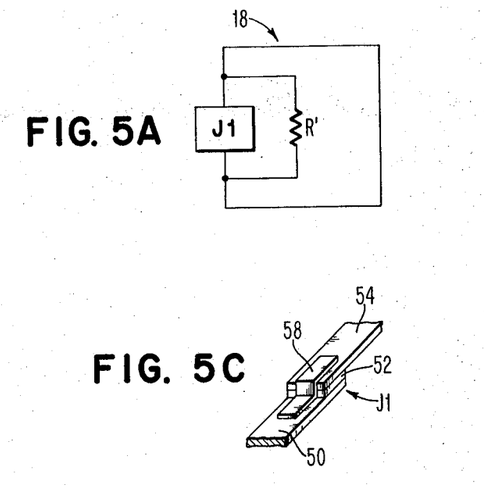
FIG. 5A shows a schematic illustration of a damped superconducting loop used for measurement and analysis of waveforms, which is capable of high speed switching between voltage states.
FIGS. 5B and 5C show two embodiments for realizing the circuitry of FIG. 5A.
Figures 5B, 6:
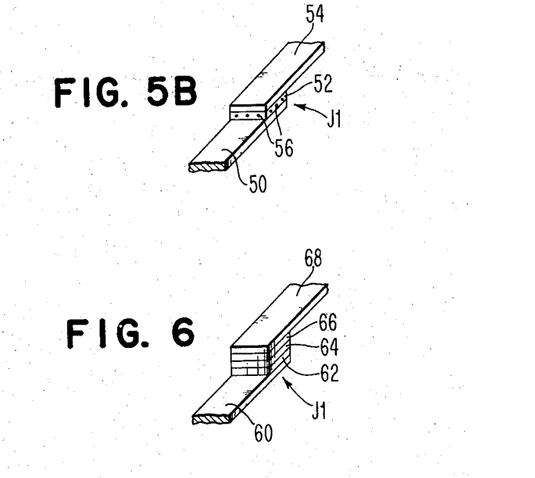
FIG. 6 shows a Josephson tunneling junction having a plurality of series connected junctions, in order to reduce the capacitance of the superconducting loop used for measurement and analysis.

Figures 5A, 5B and 5C

Superconductive loop 18 of FIG. 1 is essentially a parallel R, L, C circuit. For maximum speed of switching from its zero voltage state to its finite voltage state, superconductive loop 18 should be critically damped. The resistance of the loop 18 is the resistance of tunnel device J1, and an external parallel resistor may be required in order to obtain enough resistance for critical damping. That is, the total resistance R of the loop should satisfy the relation $$R = \tfrac{1}{2} \sqrt{L/C} \text{ for maximum speed.}$$

3

If the resistance has this value, loop 18 will delay the penetration of external flux with a time constant $\tau$ given by:

$$\tau = 2RC$$

4

FIG. 5A shows loop 18 having a resistor R' in parallel with junction J1 so that the total resistance of superconductive loop 18 is sufficient to satisfy the above relation (3).

FIGS. 5B and 5C show two embodiments for obtaining a parallel resistance R'. In FIG. 5B, Josephson device J1 is comprised of a superconductive base electrode 50, a tunnel barrier 52 and a counter electrode 54 which is also superconductive. Tunnel barrier 52 is generally an oxide of base electrode 50. In this embodiment, small dots 56 of a metal which will not oxidize well have been included in tunnel barrier 52. A suitable example for a metal dot is gold. This increases the resistance of tunnel barrier 52 to increase the total loop resistance R.

In FIG. 5C, the same reference numerals are used as were used in FIG. 5B. That is, base electrode 50 has a tunnel barrier 52 thereon. Located over counter electrode 54 is a layer 58 comprised of any normal (non-superconducting) metal. A suitable example is gold. It is only necessary that layer 58 be not superconducting at the operating temperatures of junction J1.

Layer 58 provides a resistive path between base electrode 50 and counter electrode 54 and thereby serves as the additional resistor R'.

Figure 6

In order to reduce the time constant (2RC) of superconductive loop 18, it is desirable to make the capacitance C as low as possible. Junction capacitances of 10 pF can be realized with this device. Also, the capcitance may be lowered by replacing the single junction of J1 by a stack of tunnel junctions in series to provide a structure in which $I_{Jm}$ is not affected. This is shown in FIG. 6. Additionally, reference is made to U. S. Pat. No. 3,643,237 which describes a Josephson tunneling device comprising a series of tunnel junctions.

Tunnel device J1 of FIG. 6 comprises a base electrode 60, a first tunnel barrier 62, a second electrode 64, a second tunnel barrier 66 and a third electrode 68. Tunnel current $I_{J1}$ flows between electrodes 60 and 68, passing through the series connected tunnel barriers 62 and 66. If desired, multiple stacks of junctions can be provided in the same tunnel device, and more than two tunnel junctions can be used in any one stack.

Figure 7:
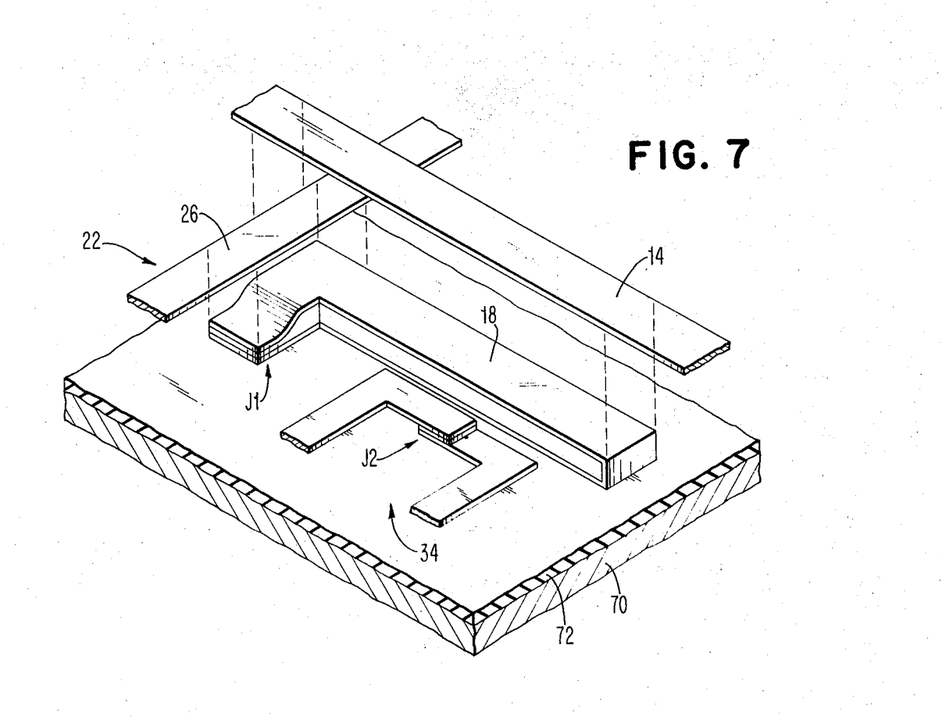
FIG. 7 shows a structural diagram of a portion of the apparatus in FIG. 1, illustrating the planar method of fabrication of the apparatus of FIG. 1.

Figure 7

FIG. 7 shows a portion of the structure of the circuit of FIG. 1 to illustrate the fabrication of the waveform measuring and analysis device. The same reference numerals are used in this FIG. as were used in FIG. 1.

A superconductive ground plane 70 is provided on which is deposited a layer of insulation 72. The insulation could be, for instance, SiO or any other suitable insulation. Superconductive loop 18 and apparatus 34 are provided by depositing superconductive materials onto insulation 72 in a known manner. This comprises a series of metal depositions and the provision of insulating layers between the various layers of metallization. In the same manner, insulation is provided over loop 18 and conductor 26 of control means 22 is provided over the area of junction J1. Insulated from control means 22 is the signal line 14, which is preferably a superconductive material.

The entire structure of FIG. 7 is very small and can be fabricated in a planar geometry by known methods. This structure is located in a suitable cryogenic refrigerator when the measurement and analysis of signal pulses is made. Such refrigerators are well known in the art and will not be described in detail here.

Figure 8:
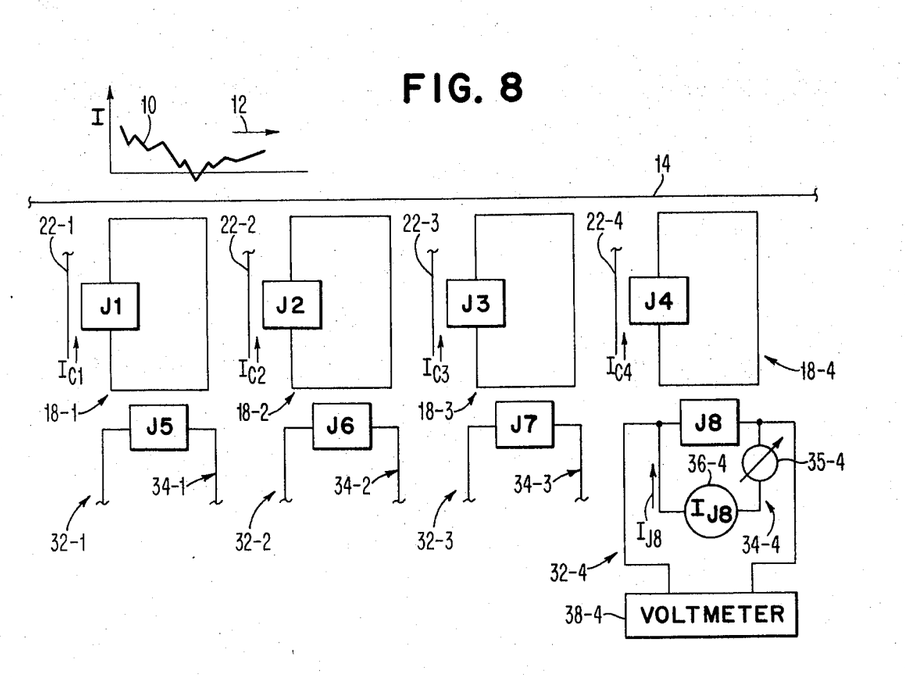
FIG. 8 illustrates the use of plurality of superconductive loops for measurement of the input signal.

Figure 8

Whereas only one superconductive loop 18 was shown in FIG. 1, it is possible to provide a number of superconducting loops, each of which has at lease one Josephson tunneling device therein. Accordingly, the input signal can then be analyzed throughout its width. This enables a very accurate representation of the signal to be made even though the signal is not repetitive. Further, if the superconductive loop control lines are all activated at the same time, a complete waveform can be stored at once which allows sampling and storage of non-repetitive signals having a bandwidth of the order of 100 gHz.

In FIG. 8, a waveform 10 to be measured travels in the direction of arrow 12 along signal line 14. Instead of using a single superconductive loop 18 as was done in the circuit of FIG. 1, a plurality of superconducting loops 18-1, 18-2, 18-3 and 18-4 are provided. Of course, there can be any number of such loops. The superconducting loops each have a Josephson tunneling device therein. For instance, superconductive loop 18-1 has Josephson tunneling device J1 therein, while superconducting loop 18-4 has Josephson tunneling device J4 therein.

Each Josephson tunneling device J1, J2, J3, and J4 has associated therewith a control means, designated 22-1, 22-2,...22-4, respectively. These control means are generally indicated by a single conductor, the current through which establishes a magnetic field which affects the voltage state of the Josephson tunneling device in the associated super conductive loop. For instance, control means 22-1 has current $I_{c1}$ flowing therein which controls the voltage state of device J1 in loop 18-1.

Associated with each sampling superconductive loop 18-1, etc. is a detection means 32-1, 32-2, 32-3, and 32-4, respectively. Each detection means 32-1, etc. is comprised of a test loop 34-1, 34-2, 34-3 and 34-4, respectively. Each test loop has a Josephson tunneling junction and current meter 35 therein, in the manner shown for test loop 34 of FIG. 1. For instance, test loop 34-1 has Josephson tunneling device J5 therein, while test loop 34-4 has Josephson tunneling device J8 therein. In addition, each test loop has associated therewith a current source 36-1, 36-2, 36-3, 36-4 and a voltmeter for determining the voltage state of the test Josephson device. For instance detection means 32-4 has current source 36-4 and voltmeter 38-4 for determining the voltage state of device J8. For ease of drawing, only detection means 32-4 is shown in detail, it being understood that the other test Josephson devices J5, J6 and J7 are also provided with current sources and voltmeters for readout of the voltage state of these Josephson devices. In addition, a decoder can be used to provide the capability of using a common detection means for all superconductive loops 18.

The circuit of FIG. 8 can be used to determine the amplitude of waveform 10 at various places along the waveform in order to reconstruct the waveform even though it appears only once on line 14. Operation of the circuitry of FIG. 8 is the same as that of FIG. 1, and will not be explained further.

Figure 9:
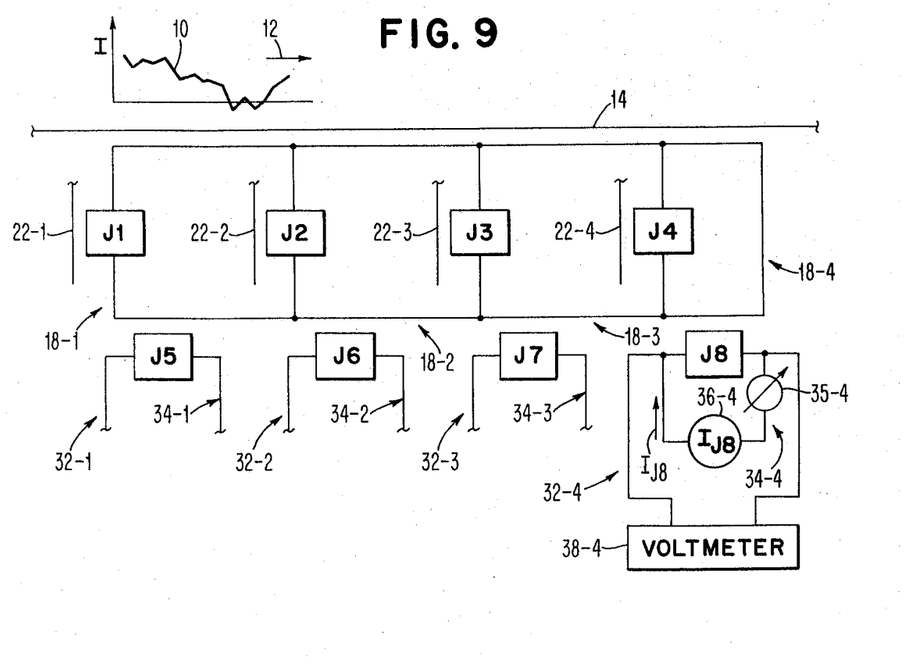
FIG. 9 shows the use of a plurality of connected superconductive loops for measurement of the input signal.

Figure 9

FIG. 9 shows another embodiment for utilizing a plurality of superconductive loops 18-1, 18-2, 18-3, and 18-4. Instead of providing separate superconductive loops as was done in FIG. 8, the superconductive loops are connected to one another so that a ladder-type structure results.

Associated with each of the superconductive test loops 18-1,...18-4 is a readout means 32-1, 32-2, 32-3 and 32-4. For ease of representation, only 32-4 is shown in detail, it being understood that identical structures are provided for the other readout means 32-1, 32-2, and 32-3. Again, the reference numerals used are the same as those used for FIG. 1 for components performing identical functions.

Operation of the device of FIG. 9 is the same as that of FIG. 8 and FIG. 1 and will not be explained further. An advantage of the structure of FIG. 9 is in fabrication, since each of the superconducting loops is connected.

What has been described is a device for precise measurement and analysis of complex waveforms which can be of very high frequency, and of a non-repetitive nature. In contrast with the circuitry of the prior art, very high resolution can be obtained in devices which are small and compact and which can be fabricated on the same structure as is other circuitry, such as Josephson memories, logic, etc.

What is claimed is:

1. An apparatus for measuring pulses of electromagnetic energy, comprising:
   a source of said electromagnetic pulses to be measured, said pulses producing a magnetic field,
   a superconductive loop having a Josephson tunneling device therein which exhibits a superconducting state and a resistive state, said loop being located in flux-coupling proximity to said magnetic field produced by said electromagnetic pulses,
   control means for switching said Josephson tunneling device to its superconductive state and to its resistive state, there being penetration of said loop by said magnetic field when said Josephson tunneling device is in its resistive state, and trapping of said magnetic flux when said Josephson tunneling device is switched to its superconductive state,
   detection means for measuring the amount of said flux trapped in said superconductive loop, said flux being proportional to the amplitude of said electromagnetic pulse at the time said flux is trapped in said loop.

2. The apparatus of claim 1, including synchronization means coupled to said source of electromagnetic pulses and to said control means for providing clock signals to said control means to trigger the operation of said control means.

3. The apparatus of claim 1, further including additional superconducting loops having Josephson tunneling devices therein, each of said additional loops being located sufficiently close to said source of electromagnetic pulses that the magnetic field produced by said electromagnetic pulses magnetically couples to each said additional loop, each said additional loop having associated therewith a control means for switching the state of the Josephson tunneling device in said additional loop and a detection means for detecting the magnetic flux stored in said additional loop.

4. The apparatus of claim 1, where said Josephson tunneling device is a planar device having a planar Josephson tunneling barrier therein.

5. The apparatus of claim 1, where said Josephson tunneling device is a weak link.

6. The apparatus of claim 1, where said control means produces a magnetic field which intercepts said Josephson tunneling device.

7. The apparatus of claim 1, where said control means inlcudes at least one current carrying control line having a control Josephson tunneling device therein having a superconducting state and a resistive state, the state of said control Josephson tunneling device determining the amount of current flowing in said control line.

8. The apparatus of claim 1, where said detection means inlcudes a test Josephson tunneling device located sufficiently close to said superconducting loop that currents flowing in said loop produce magnetic fields which couple said test Josephson tunneling device.

9. The apparatus of claim 1, where the maximum amount N of flux quanta $\phi_0$ stored in said superconducting loop is $LI_m/\phi_0$, where L is the inductance of said superconducting loop and $I_m$ is the maximum Josephson tunneling current through said Josephson tunneling device.

10. The apparatus of claim 1, where said superconducting loop is critically damped.

11. The apparatus of claim 1, further including a resistor in parallel with said Josephson tunneling device.

12. The apparatus of claim 1, where said Josephson tunneling device is comprised of a plurality of Josephson tunneling barriers in series.

13. An apparatus using Josephson tunneling devices, comprising:
   a source of electromagnetic pulses which produce magnetic flux lines,
   at least one superconducting loop having a first Josephson tunneling device therein, said loop being magnetically coupled to said flux lines produced by said electromagnetic pulses, wherein said first Josephson tunneling device has a superconducting state and a resistive state,
   control means for switching said first Josephson tunneling device between said superconductive state and said resistive state for trapping in said superconductive loop magnetic flux lines produced by said electromagnetic pulses, the amount of flux trapped being proportional to the amplitude of said electromagnetic pulses at the instant said flux is trapped,
   detection means for measuring the amount of flux trapped in said superconducting loop, said detection means including a second Josephson tunneling device magnetically coupled to said superconducting loop.

14. The apparatus of claim 13, further including additional superconducting loops each of which has a Josephson tunneling device located therein, said additional loops being sufficiently close to said source of electromagnetic pulses that the magnetic flux lines produced by said electromagnetic pulses couple to said additional loops, each said additional loop having associated therewith a control means for controlling the state of said Josephson tunneling device in said additional superconducting loop and a detection means for detecting the magnetic flux stored in said additional superconducting loop.

15. The apparatus of claim 14, wherein each said superconducting loop is critically damped.

16. The apparatus of claim 13, where said control means includes at least one current carrying control line having a control Josephson tunneling device exhibiting a superconducting state and a resistive state, the state of said control Josephson tunneling device determining the amount of current flowing in said control line.

17. The apparatus of claim 13, where said superconducting loop is critically damped.

18. The apparatus of claim 13, including a current source connected to said second Josephson tunneling device and a current measuring means connected to said Josephson tunneling device for measuring the current through said second Josephson tunneling device.

19. The apparatus of claim 14, where said superconductive loops are connected together.

20. The apparatus of claim 13, where said source of electromagnetic pulses includes a current carrying conductor along which said electromagnetic pulses travel, said conductor being sufficiently close to said superconducting loop that magnetic flux produced by said electromagnetic pulses couples to said superconducting loop.

* * * * *